United States Patent [19]
Huh et al.

[11] Patent Number: 5,325,117
[45] Date of Patent: Jun. 28, 1994

[54] COLOR DRY SILVER TYPE COLOR VIDEO PRINTER

[75] Inventors: Byung M. Huh; Sung J. Lee; Seok P. Chung, all of Seoul, Rep. of Korea

[73] Assignee: Goldstar Co., Ltd., Seoul, Rep. of Korea

[21] Appl. No.: 25,281

[22] Filed: Mar. 2, 1993

[30] Foreign Application Priority Data

| | | |
|---|---|---|
| Mar. 3, 1992 [KR] | Rep. of Korea | 3490/1992 |
| May 11, 1992 [KR] | Rep. of Korea | 7947/1992 |
| May 13, 1992 [KR] | Rep. of Korea | 8098/1992 |
| Sep. 15, 1992 [KR] | Rep. of Korea | 17476/1992 |
| Nov. 27, 1992 [KR] | Rep. of Korea | 23608/1992 |
| Dec. 21, 1992 [KR] | Rep. of Korea | 25937/1992 |

[51] Int. Cl.$^5$ .............................. H04N 1/21
[52] U.S. Cl. .................... 346/108; 358/296
[58] Field of Search ............ 346/108, 1.1, 76 L, 346/167 R, 160; 358/296, 300, 302

[56] References Cited

U.S. PATENT DOCUMENTS 4,945,222  7/1990  Sakai et al. ..................... 250/205

*Primary Examiner*—Mark J. Reinhart
*Attorney, Agent, or Firm*—Fliesler, Dubb, Meyer & Lovejoy

[57] ABSTRACT

A color dry silver (CDS) type color video printer using a color dry silver film on which a color printing is directly achieved, without using a copy sheet. The printer comprises a supply reel for supplying a CDS sheet, an exposure device for exposing the CDS sheet fed from the supply reel thereto to an optical image indicative of a picture to be printed, a capstan roller and a pinch roller for feeding the CDS sheet at a rate corresponding to an exposure rate of the exposure device, a cutting device for cutting the CDS sheet fed thereto at the trailing end of its portion exposed to the optical image, and a thermal development device for heating the cut CDS sheet so as to develop a latent image on the CDS sheet and discharging the CDS sheet through a discharging roller member. The printer also comprises a first sensor for detecting whether the CDS sheet is supplied from the supply reel, a second sensor for detecting whether the CDS sheet developed by the thermal development device is discharged, and a main controller for controlling the exposure according to detecting signals from the first and second sensors and controlling drive motors for the driving elements of the printer to regulate the overall system.

20 Claims, 17 Drawing Sheets

COLOR DRY SILVER TYPE COLOR VIDEO PRINTER

BACKGROUND OF THE INVENTION

1. Field of the Invention

The present invention relates to a color video printer, and more particularly to a color dry silver type color video printer using a color dry silver film on which a color printing is directly achieved, without using a copy sheet.

2. Description of the Prior Art

Conventionally, there have been known various methods for printing images based on electrical video signals, on hard copies. For example, they include an inkjet type wherein dye jets are injected from nozzles, to produce a pictorial image, a bubble type wherein dye is heated to form bubbles which are, in turn, pricked off to produce a pictorial image, a thermal transfer printing type and a cycolor type.

Color video printers of the thermal transfer printing type and the cycolor type mainly conventionally used will be described.

Referring to FIG. 1, there is illustrated a conventional thermal transfer printing type color video printer. As shown in FIG. 1, this color video printer comprises a drum 1, a thermal transfer printing head 2, and a film case 5 disposed between the drum 1 and the thermal transfer printing head 2 and carrying a film 5a therein. A copy sheet 3 is fed between the film 5a and the drum 1. In FIG. 1, the reference numeral denotes a guide plate for guiding the copy sheet 3.

In operation of the color video printer, an electrical video signal is converted into a heat by the thermal transfer printing head 2 and then heat transferred to the copy sheet 3 via the film 5a so that a pictorial image is developed on the copy sheet 3. As shown in FIG. 2, the film 5a carried in the film case 5 has three color portions, that is, a yellow portion, a cyan portion and a magenta portion. Accordingly, printing is repeatedly performed for individual colors at the same position of the copy sheet 3, so as to achieve a color printing.

On the other hand, FIG. 3 illustrates a cycolor type color video printer. As shown in FIG. 3, the color video printer comprises a film supply reel 7 for supplying a cycolor film 6 which is fed from the film supply reel 7 along guide rollers 11a and 11b. The color video printer also comprises a fiber optics cathode ray tube (FOCRT) 10 for exposing an optical image to be printed, to the cycolor film 6 fed thereto along the guide rollers 11a and 11b. In the vicinity of the FOCRT 10, an urging device 9 is disposed which is adapted to urge the cycolor film 6 against an exposure surface of the FOCRT 10 to be in close contact therewith. Downstream of the guide roller 11b, a copy sheet supply device 12 is disposed to supply a copy sheet 3 beneath the cycolor film 6 which has completed its exposure to the FOCRT 10 and passed the guide roller 11b. The color video printer also comprises pressure development rollers 13 for applying a certain pressure to both the cycolor film 6 and the copy sheet 3 fed beneath the cycolor film 6 to develop an image on the cycolor film 6 onto the copy sheet 3, a take-up reel 8 for winding the cycolor film 6 fed from the pressure development rollers 12 via a guide roller 11c, separately from the copy sheet 3, and thermal fixing rollers 14 for heating the copy sheet 3 separated from the cycolor film 6 by a heater (not shown) to thermally fix the image on the copy sheet 3.

In operation of the cycolor type color video printer, the cycolor film 6 is taken out of the supply reel 7 and then fed to the exposure surface of the FOCRT 10 along the guide rollers 11a and 11b. By the urging device 9, the cycolor film 6 comes into close contact with the exposure surface of the FOCRT 10. Thereafter, the cycolor film 6 is exposed at its cycolor dye-coated surface to an image to be printed, by the FOCRT 10. The image exposure is sequentially carried out by lines while the cycolor film 6 is fed. After an exposure to one frame image is completed, the copy sheet 3 is supplied from the copy sheet supply device 12 beneath the image-exposed surface of the cycolor film 6. Accordingly, the cycolor film 6 passes through the pressure development rollers 13 while overlapping with the copy sheet 3. By the pressure development rollers 13, the cycolor dye portion on the cycolor dye-coated surface of the cycolor film 6 corresponding to a latent image formed by the image exposure is broken and smeared on the copy sheet 3, to develop the image. The cycolor film 6 is then wound around the take-up reel 8. On the other hand, the copy sheet 3 passes through the thermal fixing rollers 14 so that the pictorial image thereon may be thermally fixed. Thereafter, the copy sheet 3 is discharged out of the printer.

In the above-mentioned thermal transfer printing type color video printer, the picture quality is dependant on the thermal transfer printing head 2. For obtaining a good picture quality, however, a very expensive one should be used as the thermal transfer printing head 2. Since the thermal transfer printing head 2 repeatedly comes into close contact with and separates from the film 5a during the printing operation, this color video printer involves a drawback of a noise generated upon the movements of the thermal transfer printing head 2.

On the other hand, the cycolor type color video printer requires a relatively high pressure for breaking cycolor particles so that the latent image formed by the exposure of the cycolor film is transferred to the copy sheet. As a result, the size and weight of the pressure development rollers used for the development affect greatly the overall system. Where the FOCRT is used as an image exposure source, there is a problem of a bulk size of the overall system due to the length of the CRT.

In both the thermal transfer printing type and the cycolor type, a copy sheet should be used, in addition to a film. Such a use of copy sheet requires a copy sheet supply device which causes the system volume and the cost to increase. Since the image is developed via the film, the picture quality is degraded.

SUMMARY OF THE INVENTION

Therefore, an object of the invention is to solve the above-mentioned problems encountered in the prior arts and to provide a color dry silver type color video printer using a color dry silver film on which a color printing is directly achieved, without using a copy sheet, thereby capable of improving the picture quality, achieving a compactness and a simpleness of the overall system by virtue of the requirement of a copy sheet supplying device.

Another object of the invention is to a color dry silver type color video printer using a paraxial cathode ray tube with a small size, thereby capable of reducing the overall system size.

In accordance with the present invention, this object can be accomplished by providing a color dry silver (CDS) type color video printer comprising: a supply reel for supplying a CDS sheet; an exposure device for exposing the CDS sheet fed from the supply reel thereto via a feeding roller member, to an optical image indicative of a picture to be printed; a capstan roller and a pinch roller for feeding the CDS sheet at a rate corresponding to an exposure rate of the exposure device; a cutting device for cutting the CDS sheet fed thereto by the capstan roller and the pinch roller at the trailing end of its portion exposed to the optical image; a thermal development device for heating the cut CDS sheet fed by a feeding roller member via a guide roller so as to develop a latent image on the CDS sheet and discharging the CDS sheet through a discharging roller member; a first sensor for detecting whether the CDS sheet is supplied from the supply reel; a second sensor for detecting whether the CDS sheet developed by the thermal development device is discharged; and a main controller for controlling the exposure according to detecting signals from the first and second sensors and controlling drive motors for the driving elements of the printer to regulate the overall system.

The exposure device comprises a paraxial cathode ray tube with a simple construction.

The cutting device comprises a cutter unit pivotally mounted to a support bracket fixed to a low portion of a printer body and adapted to cut the CDS sheet, a cutter driving unit provided with a motor and adapted to transmit one-directional rotation force from the motor to the cutter units so as to drive it, and a cutter control unit adapted to actuate the cutter driving unit under a control of the controller and sense one-time operation of the cutter driving unit so as to stop it.

The thermal development device comprises a heating roller for heating the exposed CDS sheet to thermally color it, an endless belt for feeding the exposed CDS sheet while maintaining it in close contact with the heating roller, an endless belt driving roller disposed at an angle with respect to the heating roller to drive the endless belt and a driven roller disposed at an angle with respect to the heating roller and in opposite to the endless belt driving roller, to guide the driving of the endless belt, a tension roller resiliently mounted by means of a resilience member and adapted to always apply a tension of the endless belt, and a motor actuatable under a control of the main controller and adapted to rotate the heating roller and rotate the driving roller via a reduction unit.

The thermal development device also comprises a separator for separating the development-completed CDS film from the endless belt.

BRIEF DESCRIPTION OF THE DRAWINGS

Other objects and aspects of the invention will become apparent from the following description of embodiments with reference to the accompanying drawings in which:

FIGS. 5A and 5B illustrate a paraxial cathode ray tube (P-CRT) used in accordance with the present invention, wherein FIG. 5A is a perspective view of the P-CRT and FIG. 5B is a schematic sectional view explaining the operation of the P-CRT;

FIGS. 6 to 8 illustrate a cutting device shown in FIG. 4, wherein FIG. 6 is a perspective view of the cutting device, whereas FIG. 7 is a schematic sectional view showing an initial state of the cutting device and FIG. 8 is a schematic view showing a cutting state of the cutting device;

FIGS. 10 to 13 illustrate a thermal development device shown in FIG. 4, wherein FIG. 10 is a schematic view of the thermal development device, FIG. 11 an exploded perspective sectional view of the thermal development device, FIG. 12 a sectional view of a heating roller of the thermal development device, and FIG. 13 a sectional view of a driving roller of the thermal development device;

FIGS. 15 to 17 illustrate a thermal development device in accordance with another embodiment of the present invention, the thermal development device including a separator, wherein FIG. 15 is a schematic view of the thermal development device having separation members, FIG. 16 an exploded perspective view of the thermal development device having the separation members, and FIG. 17 a schematic sectional view of the thermal development device having separation endless wires;

FIGS. 18 to 21 illustrate a thermal development device in accordance with another embodiment of the present invention, the thermal development device, wherein FIG. 18 is a perspective view of the thermal development device including a pair of fixed belts, FIG. 19 a side view of FIG. 18, FIG. 20 a schematic view explaining a picture surface of the CDS sheet, and FIG. 21 is a schematic sectional view of the thermal development device including a plane belt;

DESCRIPTION OF THE PREFERRED EMBODIMENTS

Figure 1:
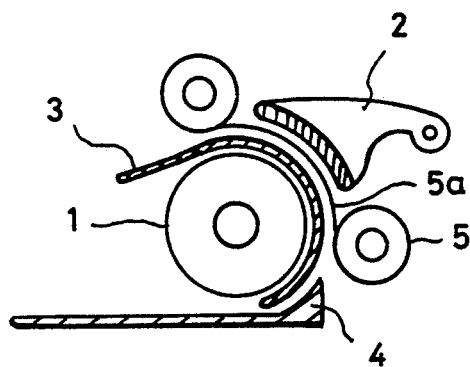
FIG. 1 is a schematic sectional view of a conventional thermal transfer printing type color video printer.
Figure 2:
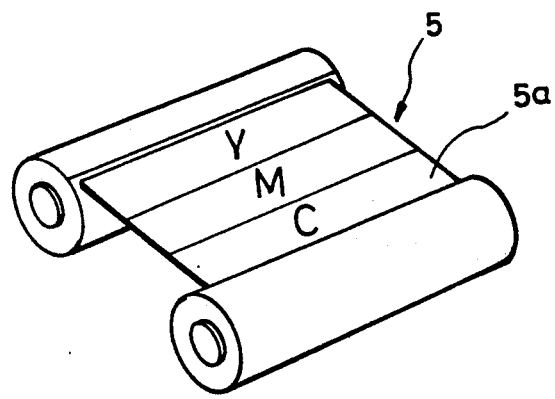
FIG. 2 is a schematic perspective view of a film case of the printer shown in FIG. 1.
Figure 3:
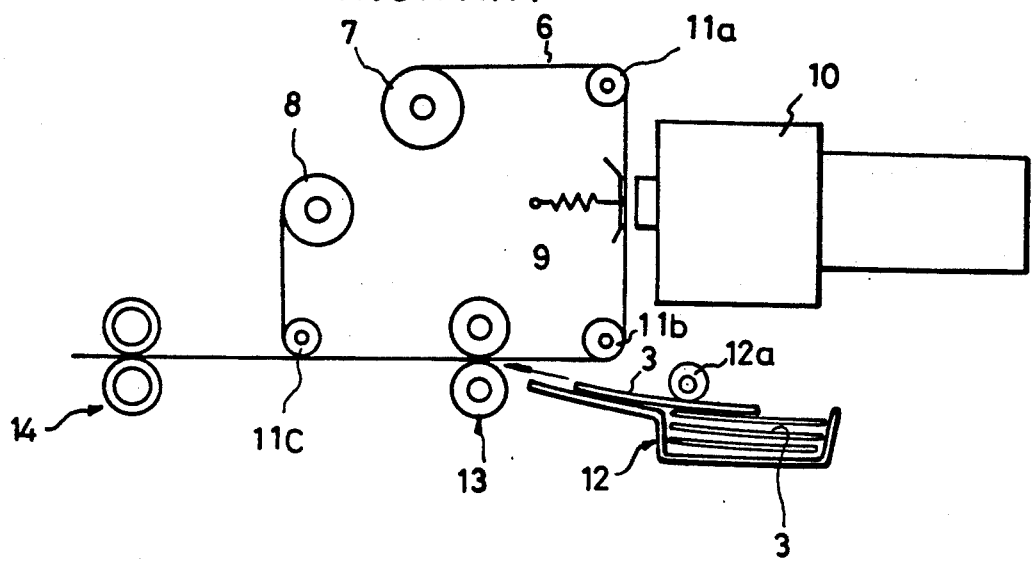
FIG. 3 is a schematic sectional view of a conventional cycolor type color video printer.
Figure 4:
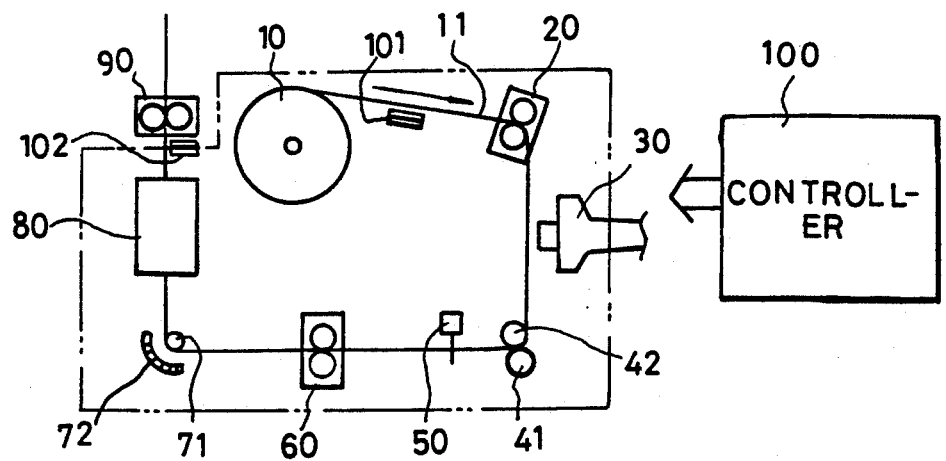
FIG. 4 is a schematic sectional view of a color dry silver type color video printer according to the present invention.

Referring to FIG. 4, there is illustrated a color dry silver (CDS) type color video printer according to the present invention.

As shown in FIG. 4, the color video printer comprises a supply reel 10 for supplying a CDS film 11 and an exposure device 30 for exposing the CDS film 11 fed from the supply reel 10 thereto to an optical image indicative of a picture to be printed. For feeding the CDS film 11 from the supply reel 10 to the exposure device 30, a feeding roller member 20 is disposed between the supply reel 10 and the exposure device 30. Also, a capstan roller 41 and a pinch roller 42 are disposed downstream of the exposure device 30, so as to feed the CDS film 11 at a rate corresponding to an exposure rate of the exposure device 30. The color video printer also comprises a cutting device 50 for cutting the CDS film 11 fed thereto by the capstan roller 41 and the pinch roller 42 at the trailing end of its portion exposed to the optical image. In order to develop a latent image on the CDS film 11, a thermal development device 80 is disposed downstream of the cutting device 50. The thermal development device 80 is adapted to heat the cut CDS film 11 fed by a feeding roller member 60 via a guide roller 71 and a guide plate 72 so as to develop the latent image on the CDS film 11 and discharge the CDS film 11 through a discharging roller member 90 disposed downstream of the thermal development device 80. The color video printer also comprises a first sensor 101 for detecting whether the CDS film 11 is supplied from the supply reel 10, a second sensor 102 for detecting whether the CDS film 11 developed by the thermal development device 80 is discharged, and a main controller 100 for controlling the exposure according to detecting signals from the first and second sensors 101 and 102 and controlling drive motors for the driving elements of the printer to regulate the overall system.

Figure 5A:
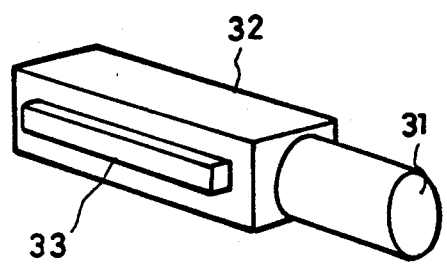
Figure 5B:
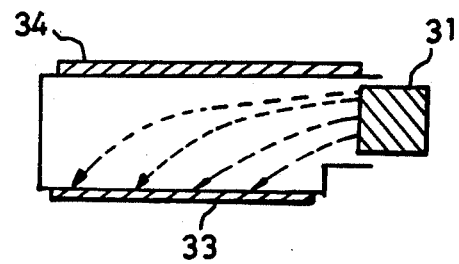

The exposure device 30 may be a FOCRT used in conventional cycolor type color video printers. Alternatively, it may be a device for converting electrical video signals into optical images to achieve an image exposure, such as an exposure device using LCD panels. In accordance with a preferred embodiment, a paraxial cathode ray tube (P-CRT) with a simple and small construction is used, so as to reduce the size of the overall system. The P-CRT comprises an electron gun 31 fixedly mounted to a P-CRT body 32, as shown in FIGS. 5A and 5B. At the front surface of the P-CRT body 32, an exposure screen 32 is fixedly mounted. In opposite to the exposure screen 33, a deflection coil 34 is fixedly mounted to the rear surface of the P-CRT body 32. The deflection coil 34 serves to deflect electrons emitted from the electron gun 31 toward a desired position, so as to scan then on the exposure screen 33.

Figure 6:
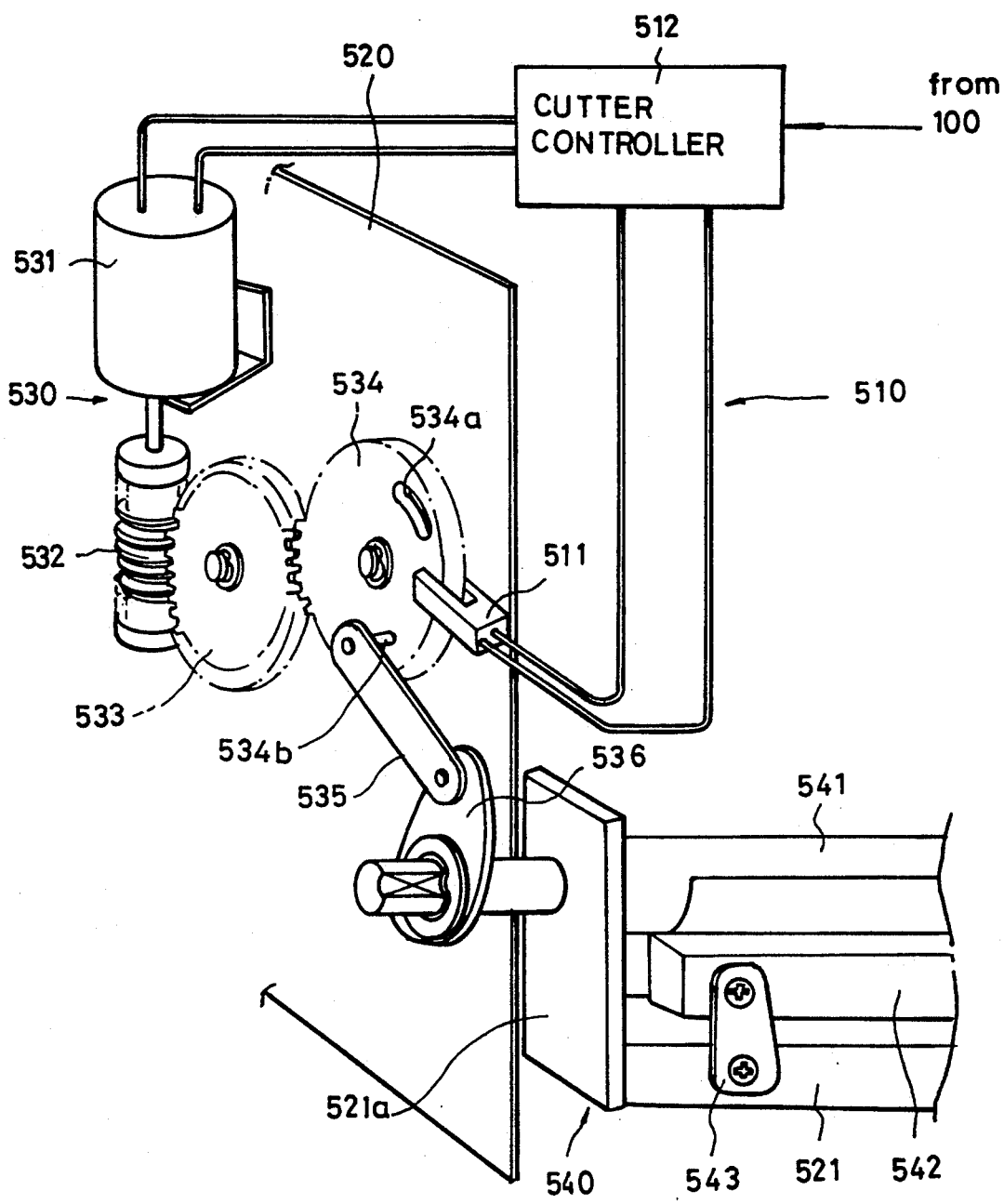

As shown in FIG. 6, the cutting device 50 comprises a cutter unit 540 pivotally mounted to a support bracket 521 fixed to a lower portion of a printer body and adapted to cut the CDS film 11, a cutter driving unit 530 provided with a motor 531 and adapted to transmit one-directional rotation force from the motor 531 to the cutter unit 540 so as to drive it, and a cutter control unit 510 adapted to actuate the cutter driving unit 530 under a control of the main controller 100 and sense one-time operation of the cutter driving unit 530 so as to stop it.

Figure 7:
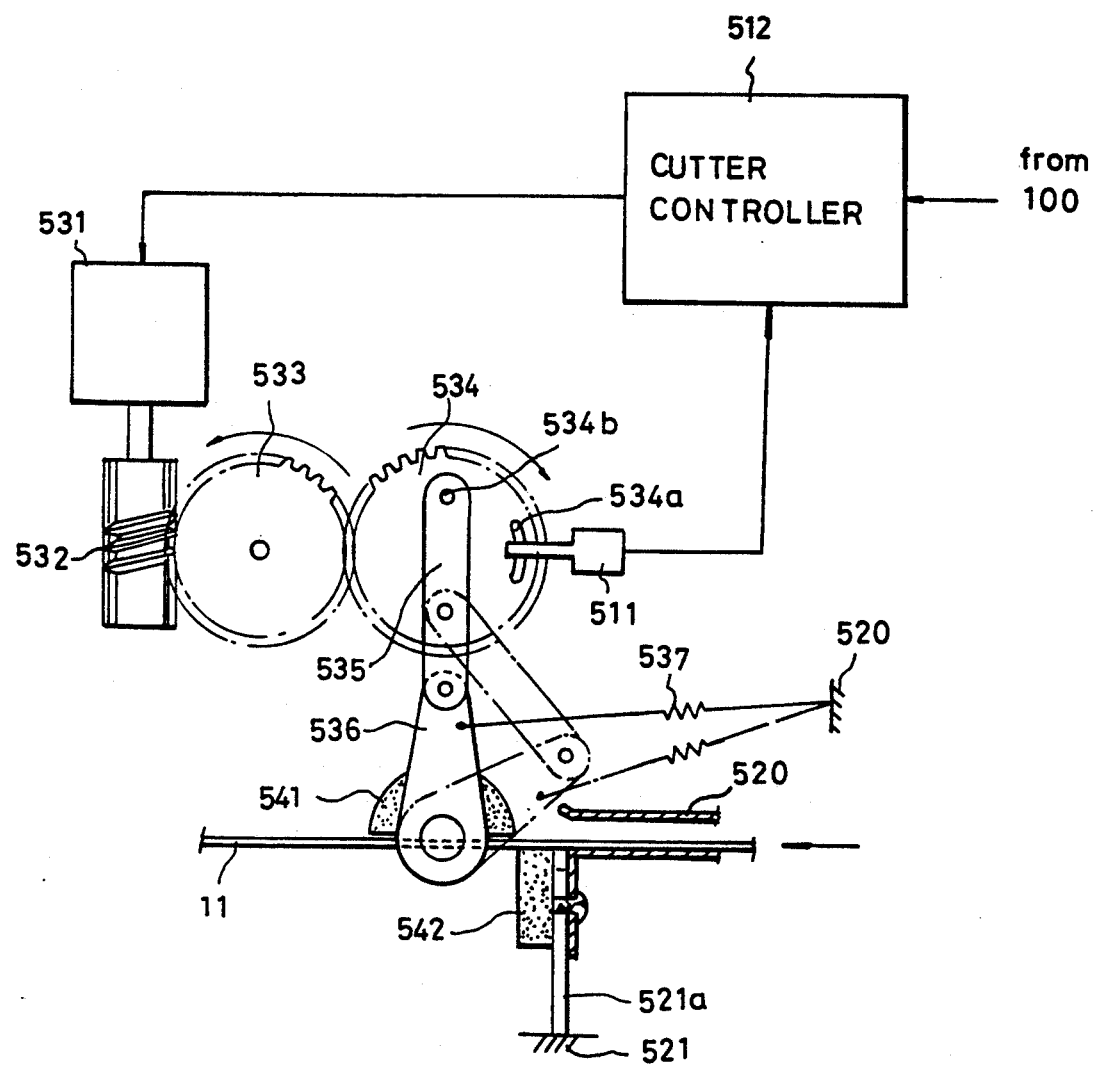

The cutter driving unit 530 includes the motor 531 fixedly mounted to a support plate 520 fixed to the printer body. To a shaft of the motor 531, a worm 532 is fixedly mounted. With the worm 532, a middle gear 534 which is rotatably mounted to the support plate 520 is engaged. Also, an actuating gear 534 is rotatably mounted to the support plate 520, so as to be engaged with the middle gear 534. The actuating gear 534 has a slot 534a at a desired position. To the actuating gear 534, a connection lever 535 is pivotally connected at one end thereof by means of a protrusion 534b formed at a desired portion of the actuating gear 534. A reciprocation lever 536 is pivotally connected at one end thereof to the other end of the connection lever 535 and fixedly mounted at the other end thereof to a cutter shaft of the cutter unit 540, so as to rotate the cutter unit 540. The reciprocation lever 536 is also connected to a compression coil spring 537 so that it is always urged to rotate in counter-clockwise, as shown in FIG. 7.

The cutter unit 540 includes a cutter 541 rotatably mounted at both end portions thereof to both support portions 521a (only one is shown in FIG. 6) of the support bracket 521 and connected to the reciprocation lever 536 of the cutter driving unit 530, so as to rotate according to the rotational reciprocation movement of the reciprocation lever 536 and thereby cut the CDS film 11, and a cutting assistant plate 542 fixedly mounted below the cutter 541 to the support bracket 521 by means of a plate spring 543 so as to cooperate with the cutter 541, for cutting the CDS film 11.

The cutter control unit 510 includes a photo sensor 511 fixedly mounted to the support plate 520 at one side of the actuating gear of the cutter driving unit 530 and adapted to sense the slot 534 formed at the actuating gear 534 and a cutter controller 512 adapted to control the driving of the motor 531 of the cutter driving unit 530 in response to a slot sensing signal from the photo sensor 511 and a cutter driving signal from the main controller 100.

Figure 10:
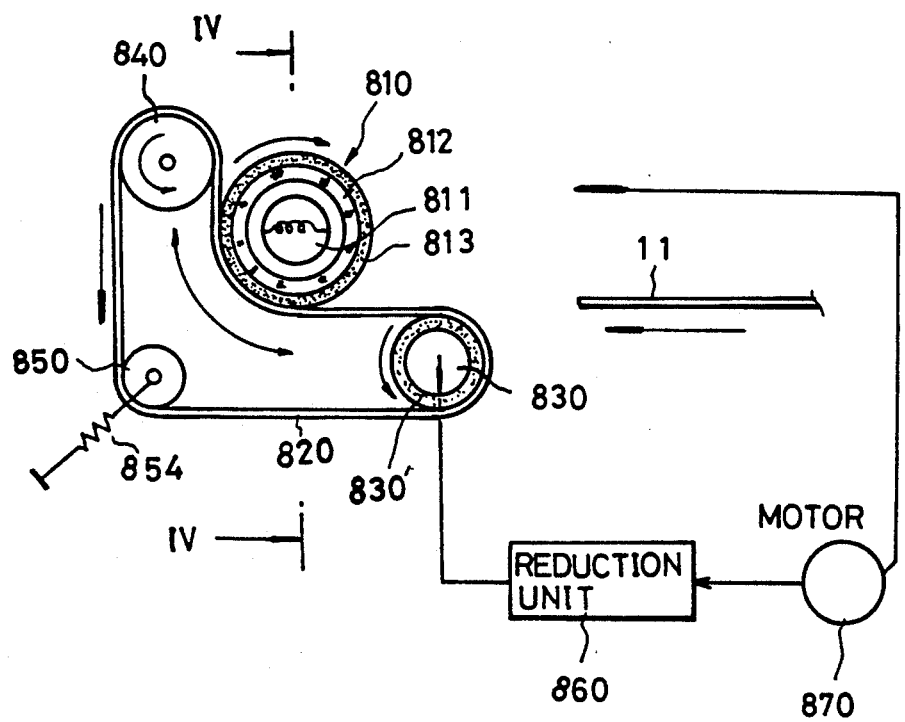
Figure 11:
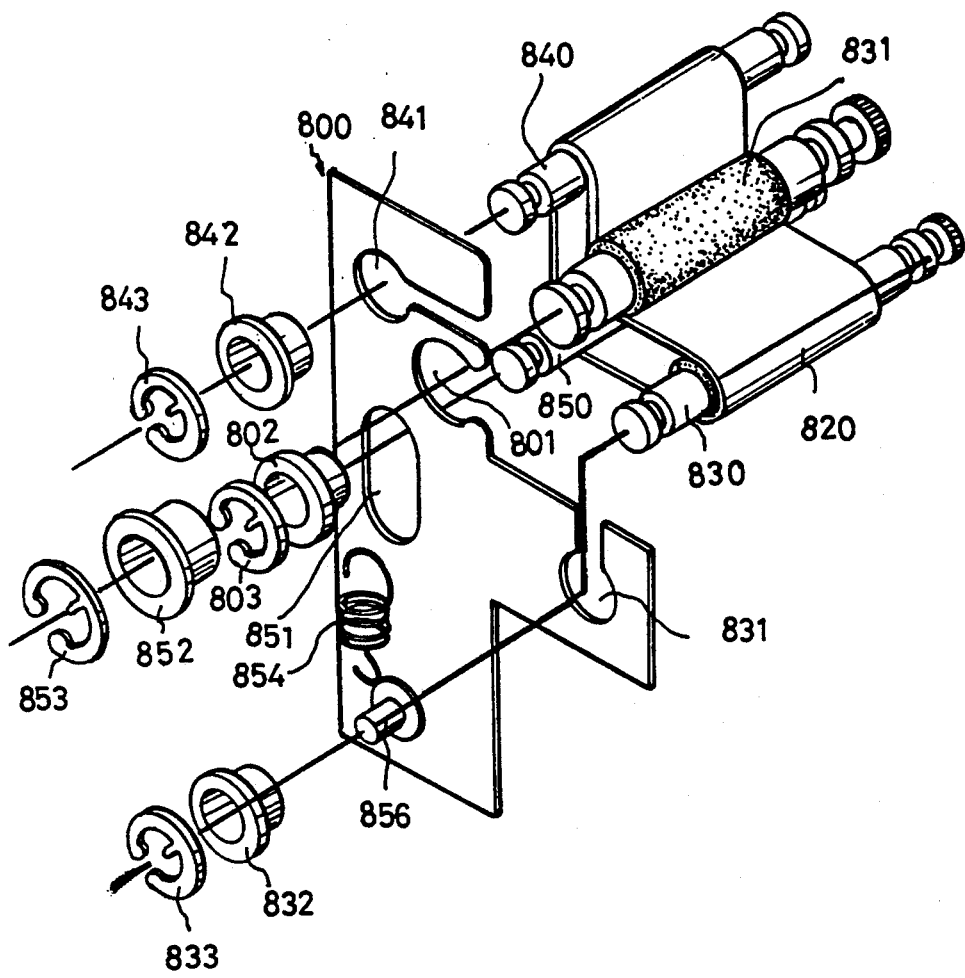
Figure 12:
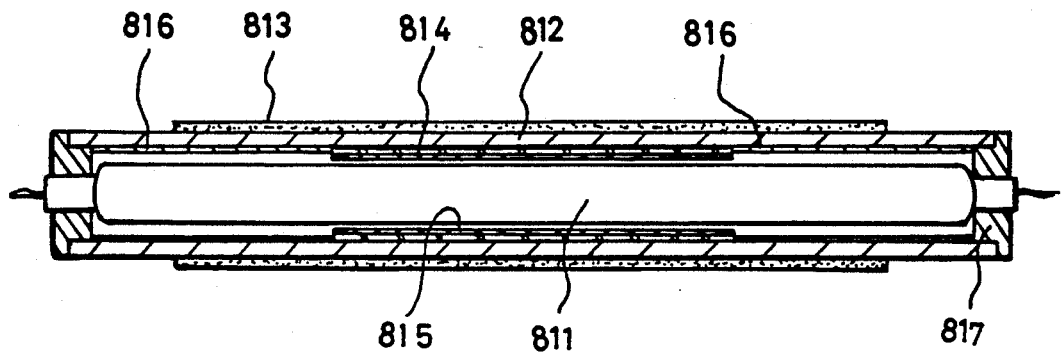
Figure 13:
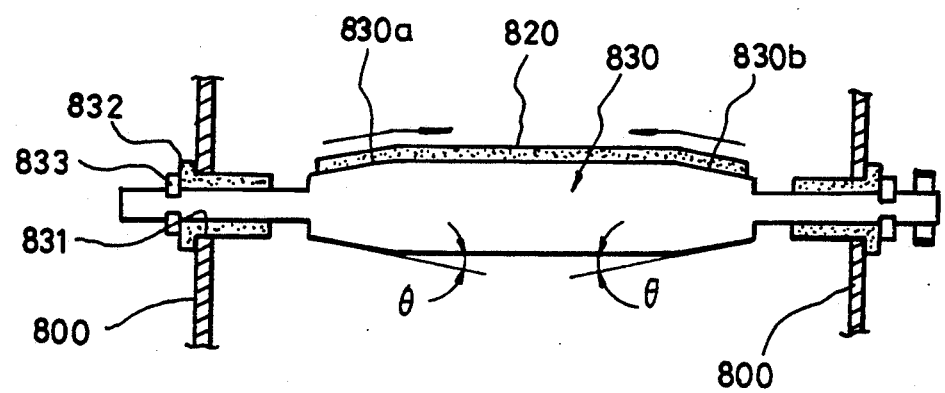

Referring to FIGS. 10 to 13, there is illustrated an embodiment of the thermal development device of the CDS type color video printer in accordance with the present invention. FIG. 10 is a schematic view of the thermal development device of the present invention. FIG. 11 is an exploded perspective view of the thermal development device shown in FIG. 10. FIG. 12 is a sectional view of a construction of a heating roller according to the present invention. FIG. 13 is a sectional view of a driving roller, showing a principle of preventing a separation of an endless belt in accordance with the present invention.

The thermal development device 80 includes a heating roller 810 for heating the exposed CDS film 11 to thermally color it, an endless belt 820 for feeding the exposed CDS film 11 while maintaining it in close contact with the heating roller, an endless belt driving roller 830 disposed at an angle with respect to the heating roller 810 to drive the endless belt 820 and a driven roller 840 disposed at an angle with respect to the heating roller 810 and in opposite to the endless belt driving roller 830, to guide the travelling of the endless belt 820, a tension roller 850 resiliently mounted by means of a resilience member 854 such as a compression coil spring and adapted to always apply a tension to the endless belt 820, and a motor 870 actuatable under a control of the main controller 100 and adapted to rotate the heating roller 810 and rotate the driving roller 830 via a reduction unit 860.

The heating roller 810 comprises a cylindrical roller body 812 provided at both ends thereof with caps 817, respectively, and a halogen lamp 811 disposed at the center portion of the cylindrical roller body 812 and supported at both ends thereof to the caps 817, respectively. Around the peripheral surface of the roller body 812, a thermal insulation member 813 is coated for retaining heat emitted from the halogen lamp 811 and providing a uniform temperature distribution on the outer surface of the heating roller 810. The thermal insulation member 813 also serves to improve the frictional coefficient of the heating roller 810 to the endless belt 820 and thus improve the thermal development efficiency. It is preferable that the thermal insulation member 813 is made of a material having a high frictional coefficient. As shown in FIG. 12, a reflection tube 814 coated with a glass layer 815 is inserted into the central portion of the inner peripheral surface of cylindrical roller body 812. Black layers 816 are also coated at both side portions of the inner peripheral surface of cylindrical roller body 812. With such construction, a uniform heat distribution can be obtained.

It is also desirable to coat a friction layer 830' made of a rubber material over the outer surface of driving roller 830, for enhancing the frictional force of the driving roller 830 to the endless belt 820 and thus making the power transmission smooth.

As shown in FIG. 11, the heating roller 820, the driving roller 830, the driven roller 840 and the tension roller 850 are rotatably supported at their opposite ends in support holes 801, 831, 841 and 851 formed at opposite bodies 800 of the thermal development device, respectively. For making the rollers 810, 830, 840 and 850 rotate smoothly, each of bushes 802, 832, 842 and 852 is provided between each of the support holes 801, 831, 841 and 851 and each corresponding end of the rollers 810, 830, 840 and 850. Retainer rings 803, 833, 843 and 853 such as E-rings are fitted around ends of the rollers 810, 830, 840 and 850 outwardly protruded through the bushes 802, 832, 842 and 852, respectively. Preferably, the bushes 802, 832, 842 and 852 are lubrication bushings, so as to make the rollers 810, 830, 840 and 850 rotate smoothly. Although not shown in the drawings, a gear is mounted to the shaft of the heating roller 810, so as to transmit the rotation force of the motor 870 to the heating roller 810. On the other hand, another gear is mounted to the shaft of the driving roller 830, so as to transmit the rotation force of the motor 870 to the driving roller 830 via the reduction unit 860.

Each of the support holes 851 supporting the tension rollers 850 has a slot shape. To each of the bushes 852 fitted in the support holes 851, one end of the resilience member 854 is mounted. The resilience member 854 is also mounted at the other end thereof to a protrusion 856 of each body 800 of the thermal development device.

Although only one is shown in FIG. 11, the bodies 800 of the thermal development device are symmetrical to each other. They may be separate ones connected with each other by means of a connection member or integral ones formed by opposite bent portions of a single member.

As shown in FIG. 13, the driving roller 830 has taper portions 830a and 830b at opposite end portions thereof, respectively. The taper portions 830a and 830b have a taper angle θ such that as they extend outwardly towards their ends, their diameters are gradually reduced. With these taper portions 830a and 830b, the endless belt 820 which is in close contact with the driving roller 830 is bent at its opposite sides, so that it is prevented from separating from the driving roller 830.

Figure 22:
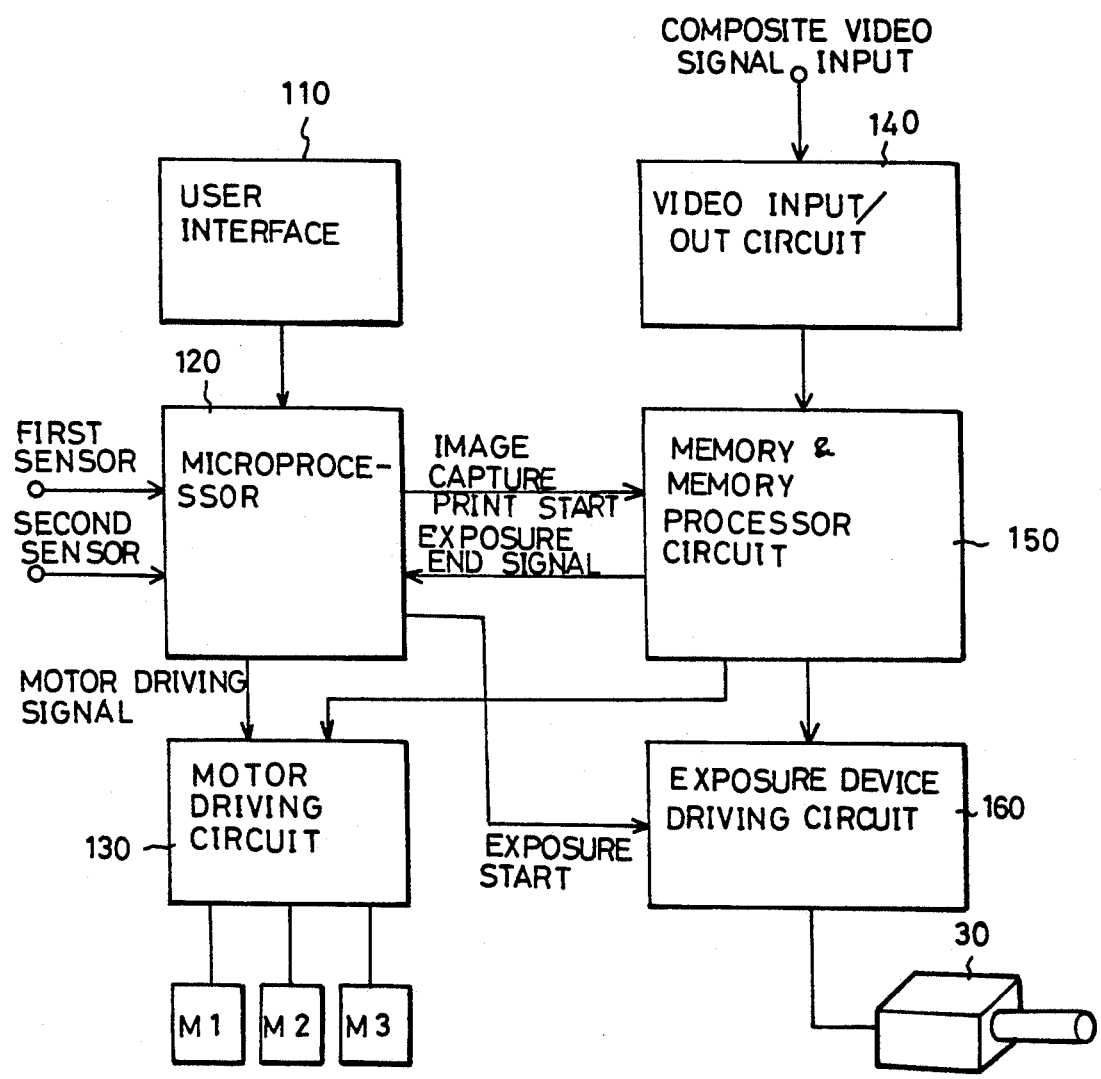
FIG. 22 is a block diagram of a main controller shown in FIG. 4.

FIG. 22 is a block diagram of the main controller of the CDS type color video printer according to the present invention. As shown in FIG. 22, the main controller comprises a user interface 110 provided with various function input switches, a microprocessor 120 for controlling the overall system, based on a control key signal received thereto from the user interface 110 and supply and discharge conditions of the CDS film 11 detected by the first sensor 101 and the second sensor 102, a motor driving circuit 130 for driving the rollers controlling the feeding of the CDS film 11, the driving motor of the cutting device and the driving motor of the thermal development device, under a control of the microprocessor 120, a video input/output circuit 140 for receiving composite video signals, decoding them by colors, converting the decoded signals into digital color signals R, G and B and outputting them, a memory and memory processor circuit 150 for sequentially storing the color signals R, G and B from the video input/output circuit 140 in its memory under a control of the microprocessor 120 and outputting them as exposure data, and an exposure device driving circuit 160 for outputting a scan signal and a high voltage required to drive the P-CRT 30, based on the exposure data from the memory and memory processor circuit 150.

The interior of the color video printer shown by a block indicated by a phantom line in FIG. 4 is of a darkroom construction completely shielded from light. With this construction, the CDS film 11 is shielded from light throughout the procedures that the CDS film 11 is taken out of the supply reel 10, passed through the exposure device 30 and the cutting device 50 and then subjected to the coloring development process in the thermal development device 80.

Operation of the color video printer with the above-mentioned construction will now be described.

The CDS type is a system for color-reproducing beam energy incident upon media approximately to original color, in an exposure manner. The media may have a structure comprising a base film and particle layers of yellow (Y), magenta (M) and cyan (C) coated on the base film. The Y, M and C particles react with one another according to the quantity of beam energy of inputted color signals, so as to exhibit a color. After such an exposure, the color is developed and fixed by a thermal energy, without requiring a pressure development as in the cycolor type.

For initiating a printing operation of the CDS type color video printer using the CDS film having the above-mentioned characteristic, the user first turns on the printer. Thereafter, as a video signal from an external signal source is received to the video input/output circuit 140 of the main controller 100 and a hard copy print command signal from an input switch of the user interface 110 is received to the microprocessor 120 of the main controller 100, the printing operation is carried out, under a control of the microprocessor 120.

As the printing operation is begun, the CDS film 11 is taken out of the CDS supply reel 10 and fed to a position between the capstan roller 41 and the pinch roller 42 via the front surface of the exposure screen 33 so that it is engaged between the capstan roller 41 and the pinch roller 42. Thus, an initial loading of the CDS film 11 is completed. Under this condition, the CDS film 11 is exposed to beams indicative of a color image to be printed, by the P-CRT.

As shown in FIGS. 5A and 5B, the P-CRT as the exposure device 30 includes the electron gun 31 attached to one side of the exposure screen 33 and the deflection coil 34 attached to the other side of the exposure screen 33. Accordingly, electrons emitted from the electron gun 31 are deflected toward a position determined by the deflection coil 34, so as to be scanned upon the exposure screen 33. By virtue of the P-CRT used as the exposure device 30, the CRT length can be shortened, as compared with the conventional OF-CRTs. Accordingly, an advantage in compactness of the system can be provided.

The P-CRT emits beams indicative of picture information to expose the CDS film 11 to the beams by lines. The capstan roller 41 feeds the CDS film 11 at a rate corresponding to the exposure rate of the exposure device 30. When the trailing end of the CDS film 11 fed by the capstan roller 41 reaches a position beneath of the cutting device 50, the feeding of the CDS film 1 by the capstan roller 41 is stopped and the cutting device is subsequently operated to cut the CDS film 11.

Figure 9:
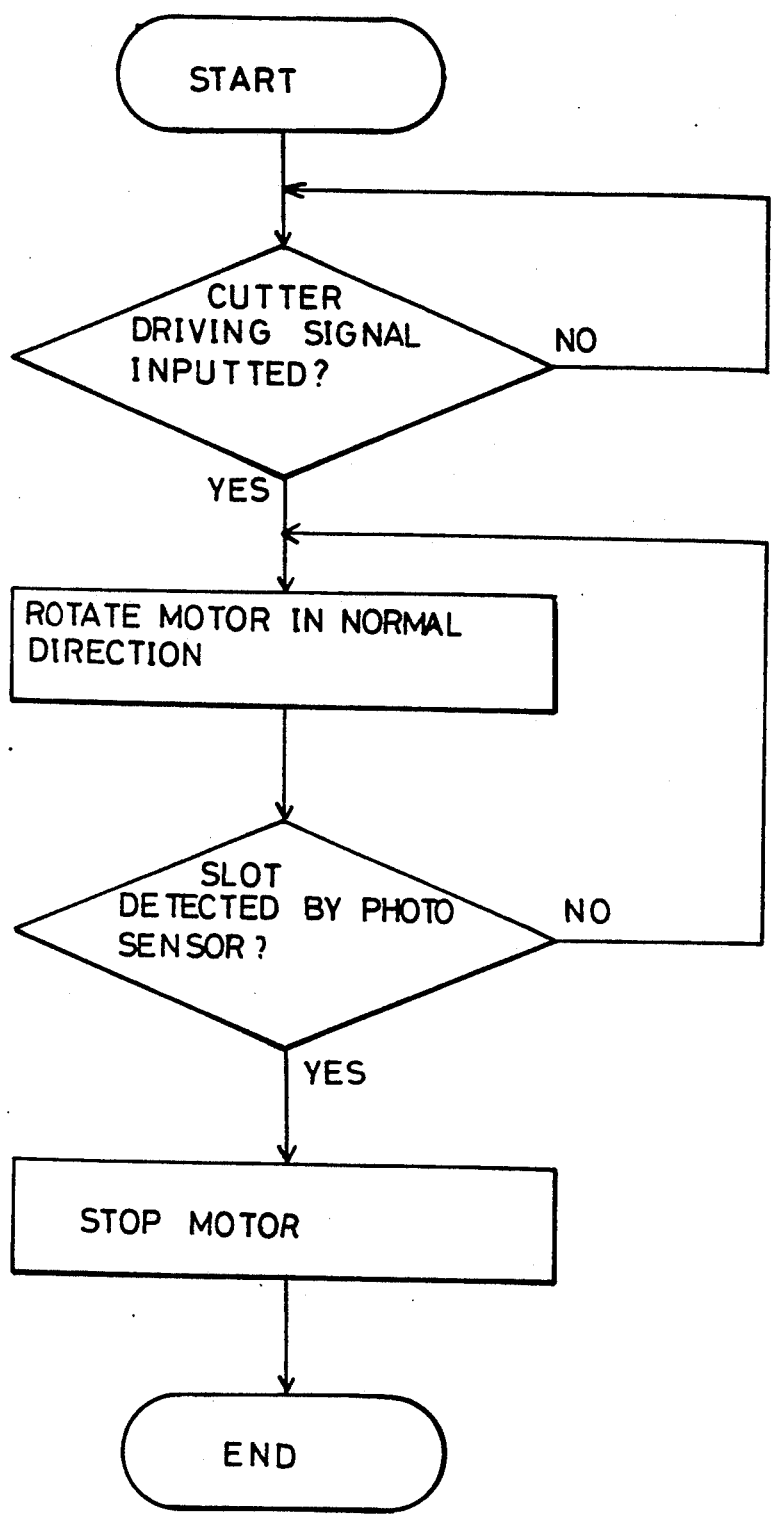
FIG. 9 is a flow chart of the cutting operation of the cutter DEVICE shown in FIG. 6.

The cutting device 50 performs its cutting operation by the cutter 541 which rotates reciprocally by the one-directional rotation of the motor 531, according to the control procedure shown in FIG. 9.

Figure 8:
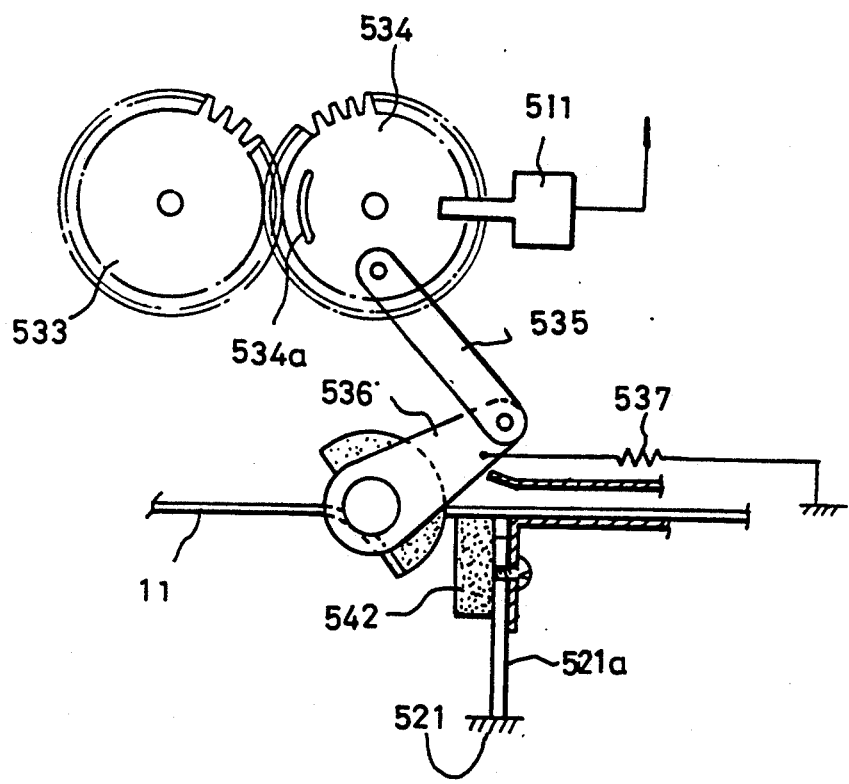

At the start of the cutting operation, the slot 534a is positioned at the photo sensor 511, as shown in FIG. 7. At this time, the rotation shaft of the cutter 541 is maintained at a position most distantly spaced from protrusion 534b of the actuating gear 534a. That is, the cutter 541 is at its cutting preparation position. When a cutter driving signal from the main controller 100 is inputted at the cutter controller 512 of the cutter control unit 510, the cutter controller 512 drives the motor 531. As the motor 531 rotates, its rotation force is transmitted to the actuating gear 534 via the work 532 and the middle gear 533, thereby causing the actuating gear 534 to rotate in clockwise. By the rotation of the actuating gear 534, the protrusion 534b formed on the actuating gear 534 also rotates in clockwise about the rotation axis of the actuating gear 534 and thereby pushes the connection lever 535, thereby causing the reciprocation lever 536 to rotate in clockwise to a position shown by a phantom line in FIG. 7 and shown in FIG. 8. Accordingly, the cutter 541 fixedly mounted to the reciprocation lever 536 rotates in clockwise and cuts the CDS film 11. As the actuating gear 534 is continued to rotate, it returns from the phantom line position to the solid line position of FIG. 7. During the return movement of the actuating gear 534, the photo sensor 511 detects the slot 511 and sends a slot detection signal to the cutter controller 512. Accordingly, the cutter controller 512 recognizes the completion of one cutting operation of the cutter 541 and then stops the motor 531. Thus, the cutting device 50 is at its standby state.

In the illustrated construction, a dead point may occur at the cutting preparation position where the connection lever 535 and the reciprocation lever 536 are aligned with each other, as shown by the solid line of FIG. 7, due to the relative positions of the actuating gear 534, connection lever 535 and reciprocation lever 536. In spite of such a dead point, the cutting device 50 can be smoothly operated, by virtue of the spring 537 which is connected between the reciprocation lever 536 and the support plate 520 and applies a tension to the levers. With the above-mentioned construction, it is also possible to achieve the cutting operation and return operation of the cutter 541 only by an optional one-directional rotation of the cutting device 50, irrespective of the rotation direction of the motor 531.

The CDS film 11 cut by the cutting device 50 is then passed through the guide roller 71 and the guide plate 72 by the feeing roller 60 and fed to the thermal development device 80. The CDS film 11 is developed by thermally coloring the exposed image by the P-CRT while passing through the thermal development device 80. Thereafter, the CDS film 11 is discharged out of the printer by the discharge roller 90.

When a driving signal from the main controller 100 is applied to the drive motor 870 of the thermal development device 80 after the cutting operation of the cutting device 50 has been completed, the driving motor 870 drives to rotate the heating roller 810. The driving motor 870 also rotates the endless belt driving roller 830, via the reduction unit 860. The reduction unit 860 serves to reduce the rotation rate of the motor 870 so that the travelling velocity of the endless belt 820 corresponds to the linear velocity of the heating roller 810 at its outer periphery.

As the driving roller 830 rotates in counter-clockwise at a rate corresponding to the rotation rate of the heating roller 810, the endless belt 820 travels by virtue of a frictional force generated at its contact surface being in contact with the driving roller 830. The driven roller 840 and the tension roller 850 also rotate in counter-clockwise, by virtue of frictional forces generated at their contact surfaces being in contact with the inner surface of the endless belt 820. At this time, the heating roller 810 which is in contact with the outer surface of the endless belt 820 rotates in clockwise, so that the CDS film 11 is fed between the heating roller 810 and the endless belt 820.

During this operation, the halogen lamp 811 of the heating roller 810 is supplied with electric power and thus emits heat. The emitted heat is outwardly transferred from the interior of the roller body 812 of the heating roller 810. At this time, the CDS film 11 is fed along the endless belt 820 and comes in contact with the heating roller 810. The contact area of the CDS film on the heating roller 810 is large, because the endless belt is in contact with a large portion of the outer surface of heating roller 810 by virtue of the angular arrangements of the driving roller 840 and driven roller 810 with respect to the heating roller 810.

The contact angle between the heating roller 810 and the endless belt 820 is illustrated in FIG. 10 as being about 90°. However, it can be determined between 90° and 180°.

The larger the contact area between the heating roller 810 and the endless belt 820, the larger the quantity of heat transferred from the heating roller 810 to the CDS film 11. This makes it possible to reduce the temperature of the heating roller 810 and increase both the travel velocity of the endless belt 820 and the rotation rate of the heating roller 810. Accordingly, it is possible to increase the thermal development rate and reduce the consumption of electric power.

The temperature of heat emitted from the halogen lamp 811 disposed at the center portion of the roller body 812 is higher at the center portion of the halogen lamp 811 than at the opposite end portions of the halogen lamp 811. The difference in temperature of the halogen lamp 811 is above about 10° C. Taking such a difference in temperature into consideration, the reflection tube 814 coated with the glass layer 815 is inserted in the heating roller 810 to be positioned at the center portion of the inner surface of the cylindrical roller body 812. Also, the black layers 816 are coated over the opposite portions of the inner surface of the cylindrical roller body 812. With this construction, a uniform heat distribution can be obtained. That is, heat is reflected at the center portion of halogen lamp 811 by the glass layer 815 of the reflection tube 814 and absorbed at the opposite end portions of halogen lamp 811 by the black layers 816. Accordingly, heat radiated from the surface of heating roller 810 is substantially uniform at the center portion and opposite end portions of heating roller 810 so that the distribution of heat transferred from the heating roller 810 to the CDS film 11 is uniform.

As mentioned above, the thermal insulation member 813 is disposed around the peripheral surface of the heating roller 810, so as to retain heat emitted from the halogen lamp 811 and thus provide a uniform temperature distribution on the outer surface of the heating roller 810 throughout the length thereof. Accordingly, the CDS film 11 which comes into contact with the heating roller 810 can be uniformly heated throughout the width thereof, so that a good thermal development can be achieved.

The tension roller 850 resiliently mounted by the resilience member 854 always apply a tension to the endless belt 820. By this tension, the contact pressure between the endless belt 820 and the heating roller 810 can be maintained at a level for optimizing the thermal development.

Figure 14:
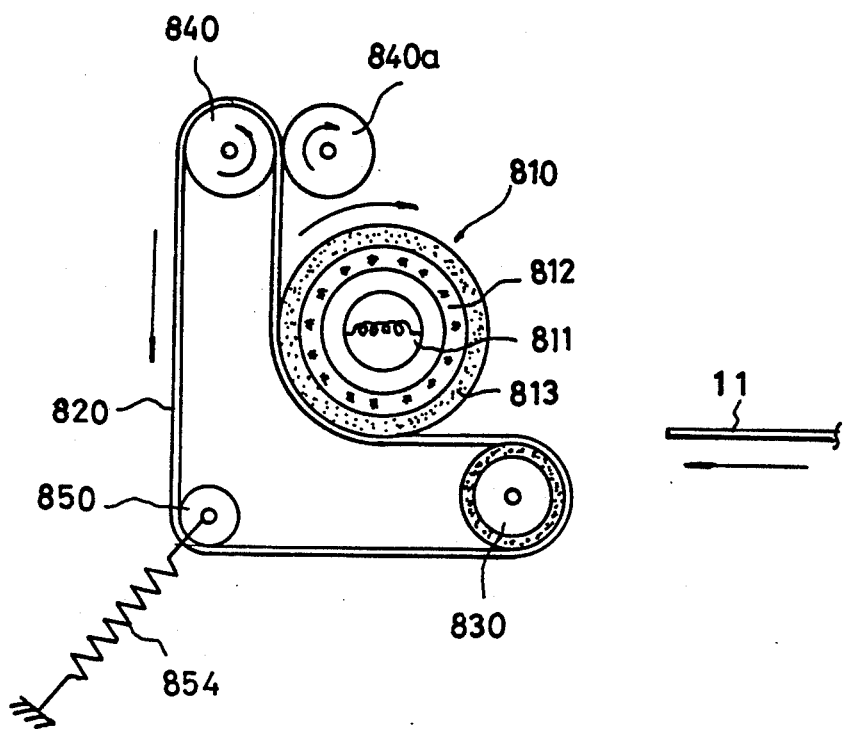
FIG. 14 is a schematic sectional view of a thermal development device in accordance with another embodiment of the present invention, the thermal development device including an assistant roller.

Referring to FIG. 14, there is illustrated a modified embodiment of the thermal development according to the present invention. In accordance with this embodiment, an assistant roller 840a is provided which is engaged with the driven roller 840 via the endless belt 820, so as to make the travelling of the endless belt 820 more smooth.

Figure 15:
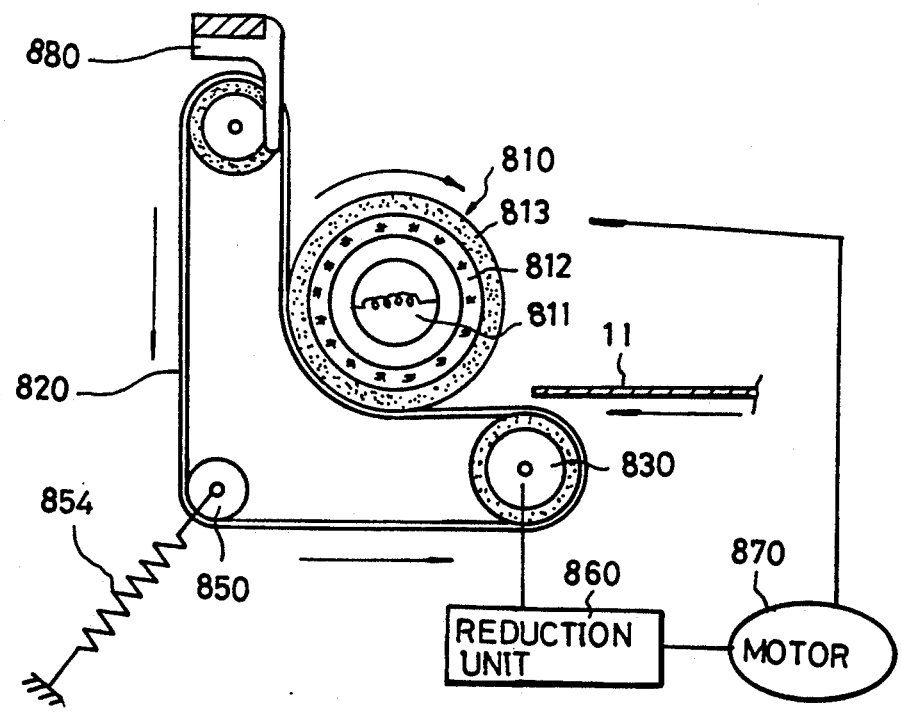
Figure 16:
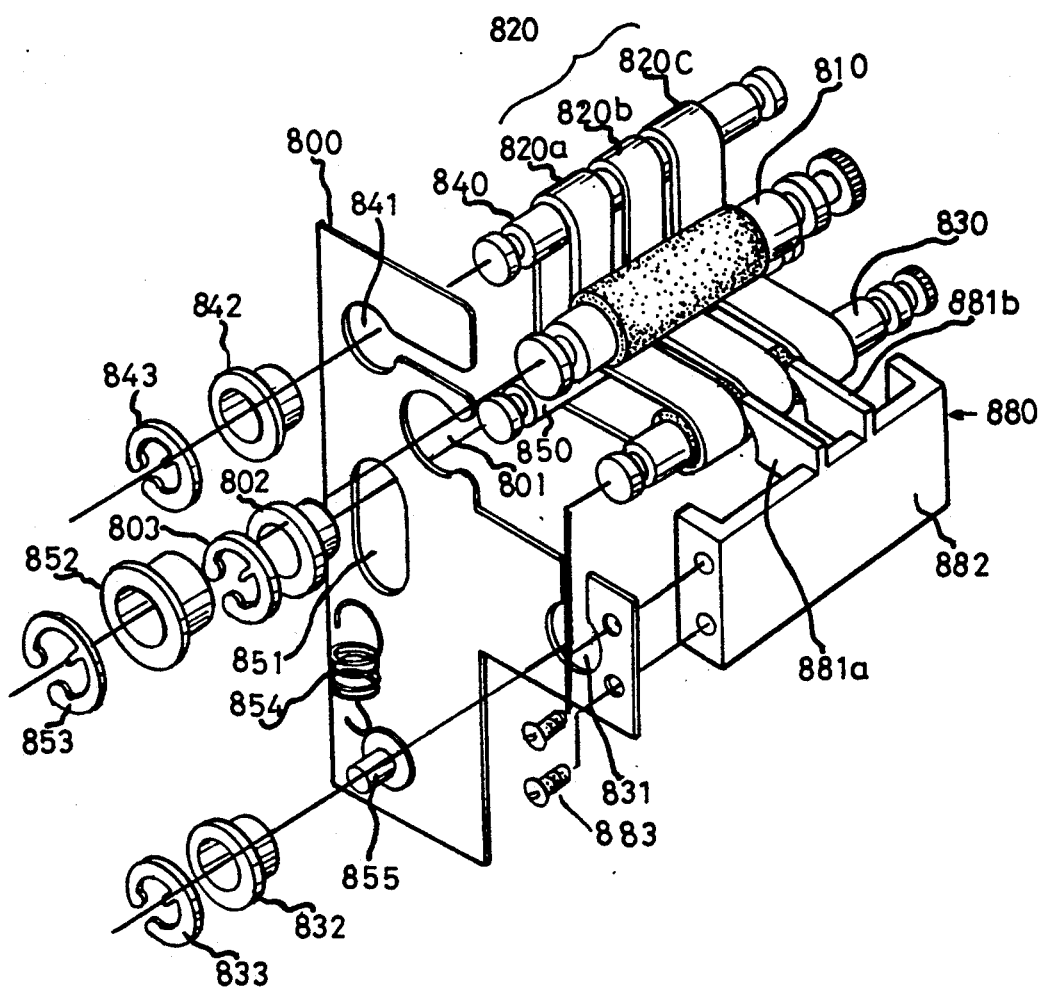

In accordance with another embodiment of the present invention, the thermal development device 80 may include a construction for easily separating the thermally colored CDS film 11 from the endless belt 820, as shown in FIGS. 15 and 16. In this case, the thermal development device 80 includes a plurality of endless belts 820a, 820b and 820c spaced from one another and disposed around the driving roller 830, the driven roller 840 and the tension roller 850 and a separator 880 disposed near the driven roller 840 at the discharging side and adapted to separate the CDS film 11 from the endless belts 820a, 820b and 820c.

In the illustrated case, the separator 880 comprises a support member 882 fixedly mounted to each body 800 of the thermal development device 80 by means of screws and disposed near the driven roller 840 and a pair of separation members 881a and 881b fixed to the upper end of the support member 882 and disposed between adjacent ones of the endless belts 820a, 820b and 820c.

In the thermal development device 80 with the separator 880, the CDS film 11 is guided at its leading end by the separation members 881a and 882b of the separator 880 while passing the driven roller 840. Accordingly, the CDS film 11 can be smoothly discharged out of the thermal development device 80 along the upper surfaces of the separation members 881a and 882b, without being attached to the endless belt 820.

Figure 17:
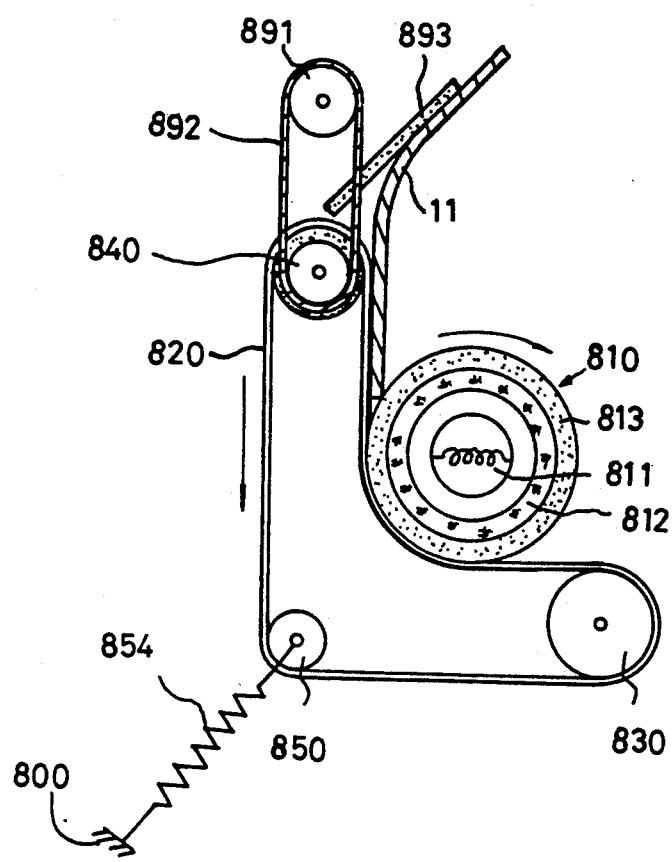

Referring to FIG. 17, there is illustrated a modified embodiment of the separator 880. In accordance with this embodiment, the separator comprises a wire guide roller 891 disposed near the driven roller 891, a pair of separation endless wires 892 disposed around the driven roller 840 and the wire guide roller 891 and between adjacent ones of the endless belts 820a, 820b and 820c, and a direction control plate 893 disposed between the driven roller 840 and the wire guide roller 891 and adapted to control the discharge direction of the CDS film 11.

In the thermal development device with this separator, the CDS film 11 which has been thermally colored is guided at its leading end by the separation endless wire 892 and the direction control plate 893 while passing the driven roller 840. Accordingly, the CDS film 11 can be smoothly discharged out of the thermal development device 80 along the upper surface of direction control plate 893, without being attached to the endless belt 820.

As apparent from the above description, the provision of the separator 880 eliminates the phenomenon that the CDS film 11 is attached to the endless belt 820. Accordingly, it is possible to improve the quality and reliability of printed products.

Figure 18:
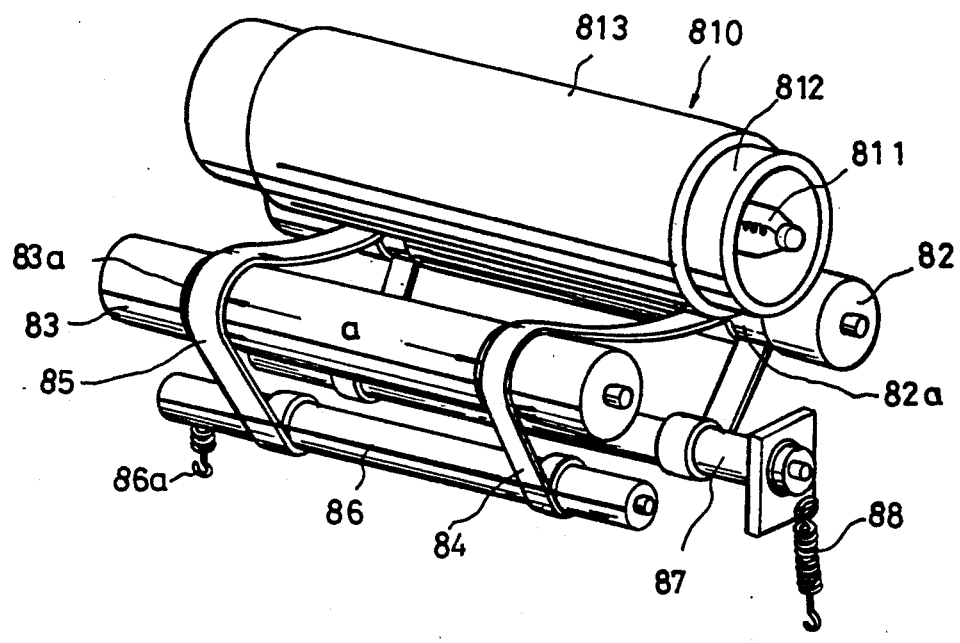
Figure 19:
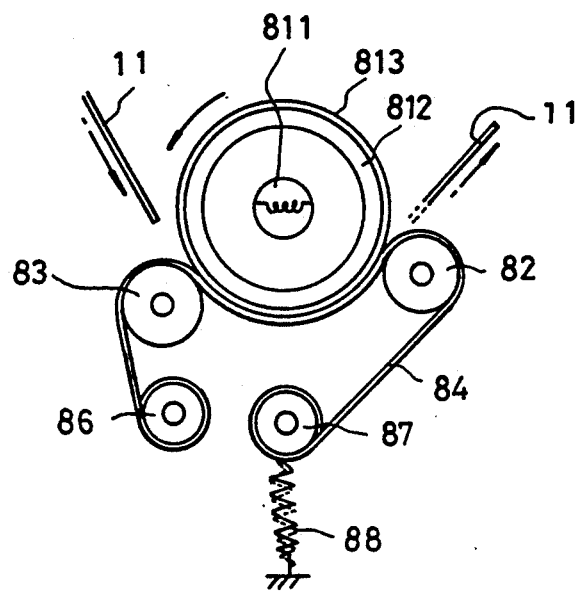

FIGS. 18 and 19 show another embodiment of the thermal development device in accordance with the present invention. In accordance with this embodiment, the thermal development device comprises a heating roller 810 for heating the exposed CDS film 11 to thermally color it, a pair of spaced guide rollers 82 and 83 oppositely disposed at an angle with respect to the heating roller 810, a fixed roller 86 disposed beneath the guide roller 83 and a resilience roller 87 disposed beneath the guide roller 82 and connected with a resilience member 86 such as a compression coil spring, and a pair of belts 84 and 85 each disposed around the fixed roller 86, the guide rollers 83 and 82, and the resilience roller 87 and fixedly mounted at both ends thereof to the fixed roller 86 and the resilience roller 87, respectively. The belts 84 and 85 guide the feeding of the CDS film 11 while maintaining it in close contact with the heating roller 810.

Figure 20:
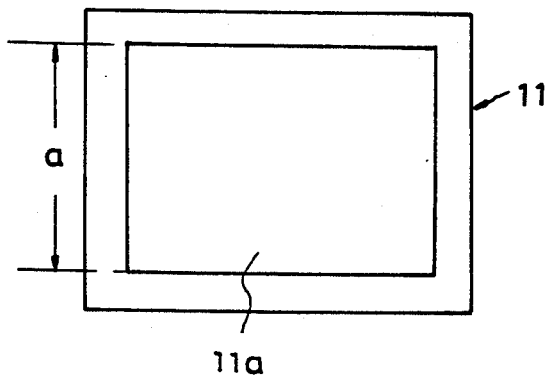

The space a between the belts 84 and 85 corresponds to the width a of the picture surface 11a of CDS film 11, as shown in FIG. 20. The guide rollers 82 and 83 have at their opposite end portions annular grooves 82a and 83a for engaging with the belts 84 and 85, so as to prevent the belts from shifting laterally, as shown in FIG. 18. The belts 84 and 85 are preferably made of a synthetic leather having a property of making an easy separation of the CDS film 11 therefrom. Over the outer surface of the heating roller 810, a silicon layer 813 is coated, so as to enhance the frictional force generated between the heating roller 810 and the CDS film 11.

When the exposed and cut CDS film 11 is introduced in the thermal development device 80 according to this embodiment, the heating roller 810 rotates and feeds the CDS film 11 by virtue of the frictional force generated between the silicon layer 813 and the CDS film 11. During the feeding, the heating roller 810 heats the CDS film 11, to color it thermally. The movement of the CDS film 11 is carried out under a condition that both ends of CDS film 11 beyond the picture surface 11a are in contact with and slipped on the belts 84 and 85, respectively. That is, the picture surface 11a of CDS film 11 does not come into contact with any elements, while the surface of CDS film 11 opposite to the picture surface 11a comes into contact with the heating roller 810 and absorbs heat therefrom, so as to be thermally colored. During this operation, the belts 84 and 85 do not rotate. They are always tensed by the resilience roller 87 connected to the resilience member 88, so that the CDS film 11 is in pressing contact with the heating roller 810.

The above-mentioned thermal development device can prevent an poor development due to a poor contact between the picture surface of CDS film 11 and the heating roller 810 or a stretch caused by a contact between the picture surface 11a and the belts 84 and 85, in that the CDS film, which is heated by the heating roller 810 to be thermally colored while being guided by the belts 84 and 85 spaced from each other by a distance corresponding to the width of the picture surface, does not come into contact with the belts 84 and 85 at the picture surface 11a. As a result, a fine picture can be obtained.

Figure 21:
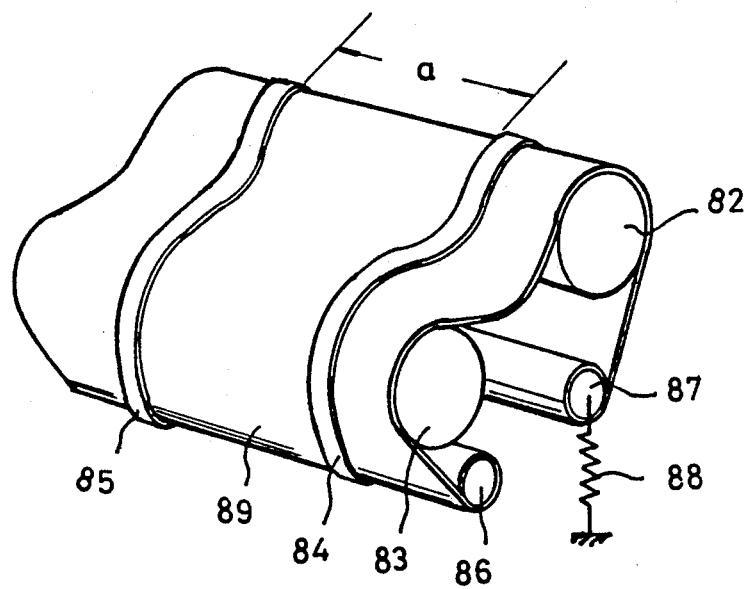

FIG. 21 shows another modified embodiment of the thermal development device according to the present invention. As shown in FIG. 21, the thermal development device comprises a plane belt 89 which is disposed around the fixed roller 86, the guide rollers 83 and 82, and the resilience roller 87 and fixedly mounted at both ends thereof to the fixed roller 86 and the resilience roller 87, respectively. On the plane belt 89, a pair of belts 84 and 85 with a space a are attached. The plane belt 89 serves to retain heat transferred to the CDS film 11 and thus enhance the thermal efficiency. The plane belt 89 also serves as a guide for easily feeding the CDS film 11.

Figure 23:
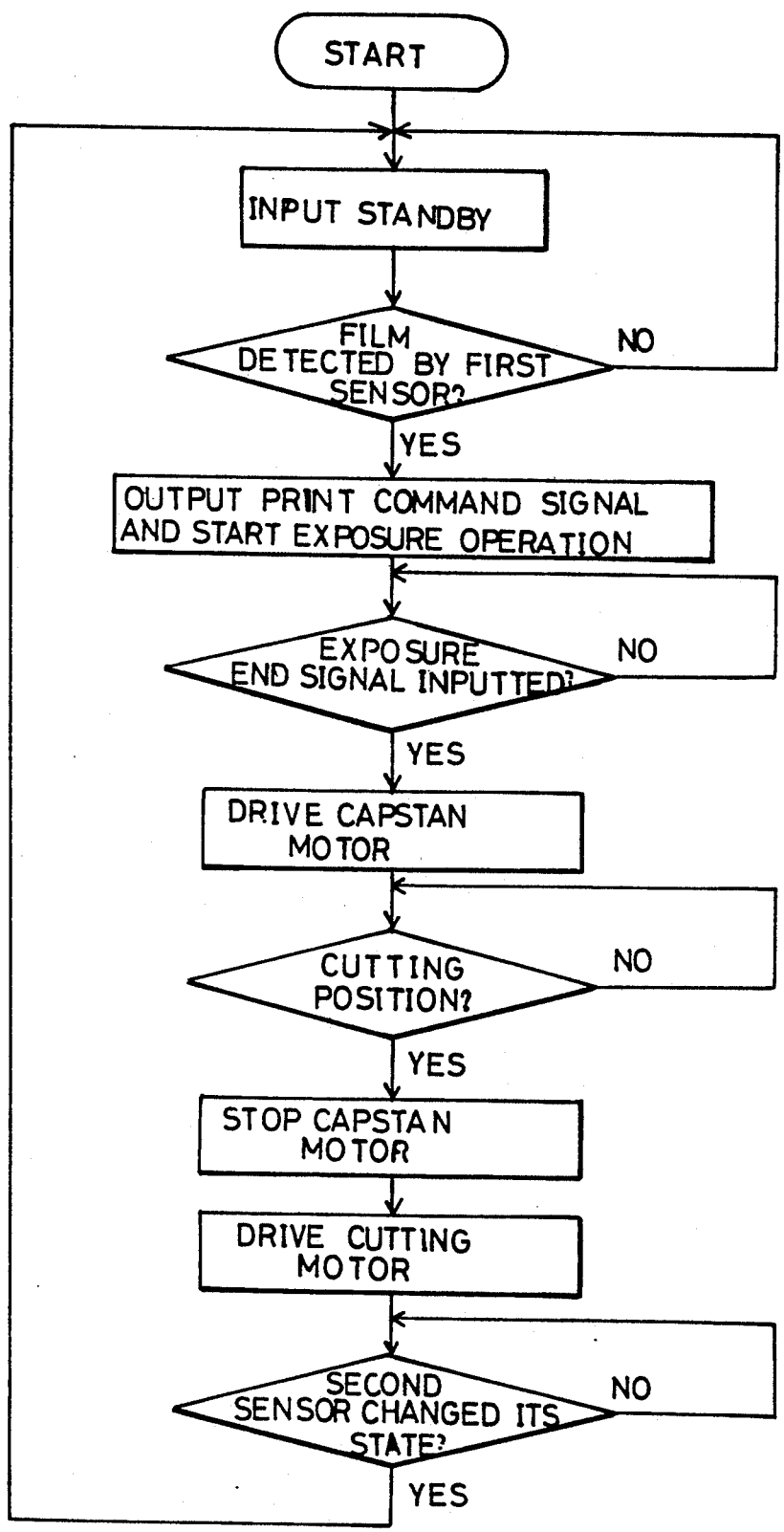
FIG. 23 is a flow chart of the print controlling operation of the main controller of FIG. 22.

Now, control operation of the main controller 100 which controls the overall system to achieve the above-mentioned operations will be described, in conjunction with FIG. 23.

First, the user inputs control key signals for controlling desired functions of the printer at the microprocessor 120 of the main controller 100 via the user interface 110. Upon receiving the control key signals, the microprocessor 120 controls the overall system, based on the control key signals and supply and discharge conditions of the CDS film 11 detected by the first sensor 101 and the second sensor 102. When composite video signals are inputted at the video input/output circuit 140 as a printing operation is begun, the composite video signals are decoded by colors and then converted into digital color signals R, G and B which are, in turn, sent to the memory and memory processor circuit 150. In the memory and memory processor circuit 150, the inputted digital color signals R, G and B are sampled, based on an image capture command signal from the microprocessor 120 so that one-frame signals are sequentially stored.

When the first sensor 101 has detected the supplying of the CDS film 11, the microprocessor 120 outputs a print command signal at the memory and memory processor circuit 150 and an exposure start command signal at the exposure device driving circuit 160. According to these command signals from the microprocessor 120, the exposure device driving circuit 160 receives image data from the memory and memory processor circuit 150 and sends it to the P-CRT 30. The exposure device driving circuit 160 also outputs a scan signal and a high voltage. Simultaneously, the microprocessor 120 outputs a motor driving signal at the motor driving circuit 130, so as to actuate the capstan motor $M_1$. The capstan motor $M_1$ rotates at a rate corresponding to the exposure rate of the CDS film 11.

After the exposure operation of the P-CRT 30 has been completed, that is, when exposure data corresponding to one frame has been outputted after image data was outputted from the memory and memory processor circuit 150 in the exposure order, a print end signal (namely, an exposure end signal) from the memory and memory processor circuit 150 is outputted at the microprocessor 120. Based on the print end signal, the microprocessor 120 outputs another motor driving signal at the motor driving circuit 130, so as to actuate sequentially the capstan motor $M_1$, the cutting motor $M_2$ and the development motor $M_3$. The capstan motor $M_1$ is driven for a time corresponding to the length of one picture on the CDS film 11, that is, a time taken until the trailing end of one picture reaches a cutting position. When the trailing end of one picture reaches the cutting position, the capstan motor $M_1$ is stopped and simultaneously the cutting motor $M_2$ is driven. Thereafter, the development motor $M_3$ is driven. When the second sensor 102 is then varied from the film-detection state to no-film-detection state, the motors are stopped. Then, the main controller 100 is at its standby state for a next frame print.

As apparent from the above description, the present invention uses the CDS film which can be a copy sheet, by itself. Accordingly, it is possible to improve the picture quality, over the conventional printers wherein a printing is achieved by developing an image on a copy sheet by means of a film.

Since no copy sheet is needed, there is no requirement of a device for supplying such a copy sheet. The present invention also makes it possible to achieve compactness and lightness of printers, in that the paraxial cathode ray tube having a size very smaller than the conventional FOCRTs is used as the exposure device. The thermal development device of the present invention does not requires a high pressure needed in cases of cycolor type printers. This contributes to a lightness. The printer construction can be also simplified, in that no thermal fixing member for fixing the developed image is required.

The printer of the present invention may be also used as a prompt type camera, in that a picture of a VCR, a TV, or a camcoder system can be immediately hard-copied.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A color dry silver (CDS) type color video printer comprising:
    a supple reel for supplying a CDS sheet;
    an exposure device for exposing the CDS sheet fed from the supply reel thereto via a feeding roller member, to an optical image indicative of a picture to be printed;
    a capstan roller and a pinch roller for feeding the CDS sheet at a rate corresponding to an exposure rate of the exposure device;
    a cutting device for cutting the CDS sheet fed thereto by the capstan roller and the pinch roller at the trailing end of its portion exposed to the optical image;
    a thermal development device for heating the cut CDS sheet fed by a feeding roller member via a guide roller so as to develop a latent image on the CDS sheet and discharging the CDS sheet through a discharging roller member;
    a first sensor for detecting whether the CDS sheet is supplied from the supply reel;
    a second sensor for detecting whether the CDS sheet developed by the thermal development device is discharged; and
    a main controller for controlling the exposure according to detecting signals from the first and second sensors and controlling drive motors for the driving elements of the printer to regulate the overall system.

2. A color dry silver type color video printer in accordance with claim 1, wherein the exposure device comprises a paraxial cathode ray tube having an electron gun adapted to emit electrons and a deflection coil adapted to deflect the electrons toward a desired position, and an exposure screen on which the deflected electrons are scanned.

3. A color dry silver type color video printer in accordance with claim 1, wherein the cutting device comprises:
- a cutter unit pivotally mounted to a support bracket fixed to a lower portion of a printer body and adapted to cut the CDS sheet;
- a cutter driving unit provided with a motor and adapted to transmit one-directional rotation force from the motor to the cutter unit so as to drive it; and
- a cutter control unit adapted to actuate the cutter driving unit under a control of the controller and sense one-time operation of the cutter driving unit so as to stop it.

4. A color dry silver type color video printer in accordance with claim 3, wherein the cutter driving unit comprises:
- the motor fixedly mounted to a support plate fixed to the printer body;
- a worm fixedly mounted to a shaft of the motor;
- a middle gear rotatably mounted to the support plate and engaged with the worm;
- an actuating gear rotatably mounted to the support plate and engaged with the middle gear;
- a connection lever pivotally connected at one end thereof to the actuating gear; and
- a reciprocation lever pivotally connected at one end thereof to the other end of the connection lever and fixedly mounted at the other end thereof to a cutter shaft of the cutter unit, so as to rotate the cutter unit, the reciprocation lever being also connected to a compression coil spring so that it is always urged to rotate in counter-clockwise.

5. A color dry silver type color video printer in accordance with claim 4, wherein the cutter unit comprises:
- a cutter rotatably mounted at both end portions thereof to both support portions of the support bracket and connected to the reciprocation lever of the cutter driving unit, so as to rotate according to the rotational reciprocation movement of the reciprocation lever and thereby cut the CDS sheet; and
- a cutting assistant plate fixedly mounted below the cutter to the support bracket by means of a plate spring so as to cooperate with the cutter, for cutting the CDS sheet.

6. A color dry silver type color video printer in accordance with claim 4, wherein the cutter control unit comprises:
- a slot formed at the actuating gear of the cutter driving unit;
- a photo sensor fixedly mounted to the support plate to one side of the actuating gear of the cutter driving unit and adapted to sense the slot; and
- a cutter controller adapted to control the driving of the motor of the cutter driving unit in response to a slot sensing signal from the photo sensor and a cutter driving signal from the main controller.

7. A color dry silver type color video printer in accordance with claim 1, wherein the thermal development device comprises:
- a heating roller for heating the exposed CDS sheet to thermally color it;
- an endless belt for feeding the exposed CDS sheet while maintaining it in close contact with the heating roller;
- an endless belt driving roller disposed at an angle with respect to the heating roller to drive the endless belt and a driven roller disposed at an angle with respect to the heating roller and in opposite to the endless belt driving roller, to guide the driving of the endless belt;
- a tension roller resiliently mounted by means of a resilience member and adapted to always apply a tension to the endless belt; and
- a motor actuatable under a control of the main controller and adapted to rotate the heating roller and rotate the driving roller via a reduction unit.

8. A color dry silver type color video printer in accordance with claim 7, wherein the heating roller comprises:
- a cylindrical roller body;
- a halogen lamp disposed at the center portion of the cylindrical roller body; and
- a thermal insulation member coated over the peripheral surface of the roller body and adapted to retain heat emitted from the halogen lamp and improve the frictional coefficient of the heating roller to the endless belt.

9. A color dry silver type color video printer in accordance with claim 8, wherein the heating roller includes a reflection tube coated with a glass layer and inserted into the central portion of the inner peripheral surface of cylindrical roller body and black layers coated at both side portions of the inner peripheral surface of cylindrical roller body, so that a uniform heat distribution can be obtained.

10. A color dry silver type color video printer in accordance with claim 7, wherein the driving roller includes a friction layer made of a rubber material coated over the outer surface thereof, so that the frictional force of the driving roller to the endless belt is enhanced, thereby making the power transmission smooth.

11. A color dry silver type color video printer in accordance with claim 7, wherein the driving roller has taper portions at opposite end portions thereof, respectively, the taper portions having a taper angle such that as they extend outwardly towards their ends, their diameters are gradually reduced.

12. A color dry silver type color video printer in accordance with claim 7, wherein the thermal development device further comprises an assistant roller engaged with the driven roller via the endless belt and adapted to make the travelling of the endless belt more smooth.

13. A color dry silver type color video print in accordance with claim 7, wherein the thermal development device further comprises a separator for easily separating the thermally colored CDS film from the endless belt.

14. A color dry silver type color video printer in accordance with claim 13, wherein the separator comprises a plurality of endless belts spaced from one another and disposed around the driving roller, the driven roller and the tension roller;
- a support member fixedly mounted to each body of the thermal development device and disposed near the driven roller; and
- a pair of separation members fixedly to the upper end of the support member and disposed between adjacent ones of the endless belts.

15. A color dry silver type color video printer in accordance with claim 13, wherein the separator comprises:
- a wire guide roller disposed near the driven roller;

a pair od separation endless wire disposed around the driven roller and the wire guide roller and between adjacent ones of the endless belts; and a direction control plate disposed between the driven roller and the wire guide roller and adapted to control the discharge direction of the CDS film.

16. A color dry silver type color video printer in accordance with claim 1, wherein the thermal development device comprises:

a heating roller for heating the exposed CDS film to thermally color it;

a pair of spaced guide rollers oppositely disposed at an angle with respect to the heating roller;

a fixed roller disposed beneath the guide roller and a resilience roller disposed beneath the guide roller and connected with a resilience member; and a pair of belts each disposed around the fixed roller, the guide rollers and the resilience roller and fixedly mounted at both ends thereof to the fixed roller and the resilience roller, respectively, the belts being slipped to guide the feeding of the CDS film while maintaining it in close contact with the heating roller.

17. A color dry silver type color video printer in accordance with claim 16, wherein the guide rollers have at their opposite end portions annular grooves for engaging with the belts, so as to prevent the belts from shifting laterally.

18. A color dry silver type color video printer in accordance with claim 16, wherein the thermal development device comprises a plane belt disposed around the fixed roller, the guide rollers, and the resilience roller and fixedly mounted at both ends thereof to the fixed roller and the resilience roller, respectively, and a pair of belts attached to the upper surface of the plane belt, the belts defining a predetermined space therebetween.

19. A color dry silver type color video printer in accordance with claim 1, wherein the main controller comprises:

a user interface provided with various function input switches;

a microprocessor for controlling the overall system, based on a control key signal received thereto from the user interface and supply and discharge conditions of the CDS sheet detected by the first sensor and the second sensor;

a motor driving circuit for driving the rollers controlling the feeding of the CDS sheet, a driving motor of the cutting device and a driving motor of the thermal development device, under a control of the microprocessor;

a video input/output circuit for receiving composite video signals, decoding them by colors, converting the decoded signals into digital color signals (R, G and B) and outputting them;

a memory and memory processor circuit for sequentially storing the color signals (R, G and B) from the video input/output circuit in its memory under a control of the microprocessor and outputting them as exposure data; and an exposure device driving circuit for outputting a scan signal and a high voltage required to drive the exposure device, based on the exposure data from the memory and memory processor circuit.

20. A color dry silver type color video printer in accordance with claim 7 or claim 16, wherein the contact angle between the heating roller and the endless belt is between 90° and 180°.

* * * * *